(12) United States Patent
Yu et al.

(10) Patent No.: US 9,864,399 B2
(45) Date of Patent: Jan. 9, 2018

(54) TIMEBASE SYNCHRONIZATION

(71) Applicant: Apple Inc., Cupertino, CA (US)

(72) Inventors: Shu-Yi Yu, Sunnyvale, CA (US); Erik P. Machnicki, San Jose, CA (US); Gilbert H. Herbeck, Livermore, CA (US); Kiran B. Kattel, San Francisco, CA (US); Manu Gulati, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 46 days.

(21) Appl. No.: 14/965,073

(22) Filed: Dec. 10, 2015

(65) Prior Publication Data

US 2017/0168520 A1  Jun. 15, 2017

(51) Int. Cl.
*G06F 1/12* (2006.01)

(52) U.S. Cl.
CPC ...................... *G06F 1/12* (2013.01)

(58) Field of Classification Search
None
See application file for complete search history.

(56) References Cited

U.S. PATENT DOCUMENTS

| | | | |
|---|---|---|---|
| 5,295,257 A | 3/1994 | Berkovich et al. | |
| 5,402,394 A | 3/1995 | Turski | |
| 5,739,663 A * | 4/1998 | Brown | H02P 25/0925 318/400.09 |
| 6,801,876 B2 | 10/2004 | Barney et al. | |
| 7,058,838 B2 | 6/2006 | Xu | |
| 8,190,942 B2 | 5/2012 | Simon et al. | |
| 2013/0042135 A1* | 2/2013 | Lopez-Aguado | G06F 1/12 713/400 |
| 2013/0070879 A1* | 3/2013 | Horley | G04F 10/04 375/354 |
| 2013/0145198 A1* | 6/2013 | Yasuda | G06F 1/04 713/502 |
| 2013/0278312 A1* | 10/2013 | Getzin | G06F 1/10 327/160 |

OTHER PUBLICATIONS

ISR/WO, PCT/US2016/051967, dated Nov. 22, 2016, 11 pages.

* cited by examiner

*Primary Examiner* — Kim Huynh
*Assistant Examiner* — Danny Chan
(74) *Attorney, Agent, or Firm* — Meyertons, Hood, Kivlin, Kowert & Goetzel, P.C.; Lawrence J. Merkel

(57) ABSTRACT

In an embodiment, an integrated circuit such as an SOC (or even a discrete chip system) includes one or more local timebases in various locations. The timebases may be incremented based on a high frequency local clock that may be subject to variation during use due. Periodically, based on a lower frequency clock that is subject to less variation, the local timebases may be synchronized to the correct time, using hardware circuitry. In particular, the correct timebase value for the next synchronization may be transmitted to each local timebase, and the control circuit for the local timebase may be configured to saturate the local timebase at the correct value if the local timebase reaches the correct value before the synchronization occurs. Similarly, if the synchronization occurs and the local timebase has not reached the correct value, the control circuit may be configured to load the correct timebase value.

19 Claims, 7 Drawing Sheets

TIMEBASE SYNCHRONIZATION

BACKGROUND

Technical Field

Embodiments described herein are related to timebase synchronization in integrated circuits such as systems on a chip (SOCs).

Description of the Related Art

In digital systems, real time (or "wall clock time") is represented by a timebase. Typically, the timebase is reset to zero at system startup, and is incremented according to a clock in the system. If the real time at the system startup is known (usually maintained in software), then the timebase value can be added to the real time to determine the current time.

For larger systems or integrated circuits in the system, such as SOCs, accessing a single global timebase with low latency is a challenge. In the past, a global timebase bus was sent across the SOC to locations at which access to the timebase is needed. While this approach can provide low latency access, it increases area overhead to route the bus to all the desired access points and it is difficult to close timing in the physical design because of the latency of signal propagation on the bus. Another approach includes adding local timebases across the SOC. However, due to local clock variations and even different clock sources for clocks at various points, synchronization between the global timebase and the local timebases can easily be lost. Software may read the global timebase and propagate the timebase to the local timebases to synchronize to the local timebases, but the latency to propagate the new values must be accounted for and is difficult to determine precisely. Additionally, software synchronization may be much less frequent than desirable, allowing local timebases to experience wide variations during the time period between synchronizations.

Furthermore, to maintain timebase accuracy, a high-quality crystal clock signal is required. While low frequency crystal clock signals may be available, such clocks do not provide higher accuracy/granularity in the timebase because the timebase updates occur too infrequently as compared to the operating clock frequencies of various components of the SOC. It is difficult to obtain the required frequency through a crystal signal. Furthermore, an external timebase may be maintained based on the low frequency crystal clock signal, and synchronization between the external timebase and various timebases within the SOC may be difficult to achieve.

SUMMARY

In an embodiment, an integrated circuit such as an SOC (or even a discrete chip system) includes one or more local timebases in various locations. The timebases may be incremented based on a high frequency local clock that may be subject to variation during use. Periodically, based on a lower frequency clock that is subject to less variation, the local timebases may be synchronized to the correct time, using hardware circuitry. In particular, the correct timebase value for the next synchronization may be transmitted to each local timebase, and the control circuit for the local timebase may be configured to saturate the local timebase at the correct value if the local timebase reaches the correct value before the synchronization occurs. Similarly, if the synchronization occurs and the local timebase has not reached the correct value, the control circuit may be configured to load the correct timebase value. Thus, high resolution/granularity in the timebase, low latency access to the timebase, and high accuracy of the time base may be supported while eliminating the need of software synchronization. Synchronization to an external timebase may be also be performed, e.g. by transmitting the correct timebase value for the external timebase at the next synchronization event to the local timebases and saturating/updating to those local timebases.

BRIEF DESCRIPTION OF THE DRAWINGS

The following detailed description makes reference to the accompanying drawings, which are now briefly described.

Figure 1:
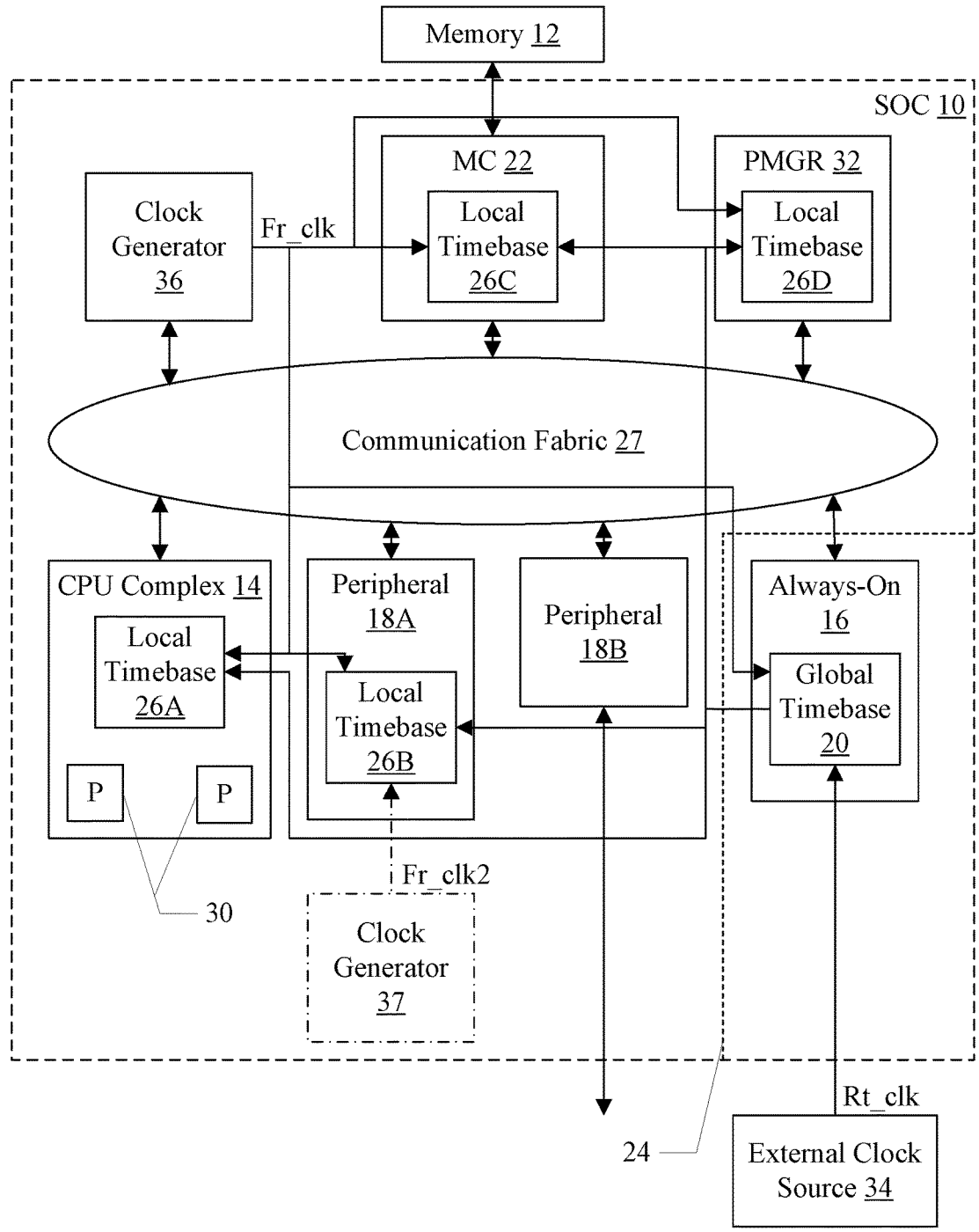
FIG. 1 is a block diagram of one embodiment of an integrated circuit including an SOC.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. The hardware circuits may include any combination of combinatorial logic circuitry, clocked storage devices such as flops, registers, latches, etc., finite state machines, memory such as static random access memory or embedded dynamic random access memory, custom designed circuitry, analog circuitry, programmable logic arrays, etc. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112(f) interpretation for that unit/circuit/component.

In an embodiment, hardware circuits in accordance with this disclosure may be implemented by coding the description of the circuit in a hardware description language (HDL) such as Verilog or VHDL. The HDL description may be synthesized against a library of cells designed for a given integrated circuit fabrication technology, and may be modified for timing, power, and other reasons to result in a final design database that may be transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and may further include other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA.

This specification includes references to "one embodiment" or "an embodiment." The appearances of the phrases "in one embodiment" or "in an embodiment" do not necessarily refer to the same embodiment, although embodiments that include any combination of the features are generally contemplated, unless expressly disclaimed herein. Particular features, structures, or characteristics may be combined in any suitable manner consistent with this disclosure.

DETAILED DESCRIPTION OF EMBODIMENTS

Turning now to FIG. 1, a block diagram of one embodiment of an SOC 10 is shown coupled to a memory 12 and an external clock source 34. As implied by the name, the components of the SOC 10 may be integrated onto a single semiconductor substrate as an integrated circuit "chip." In some embodiments, the components may be implemented on two or more discrete chips in a system. However, the SOC 10 will be used as an example herein. In the illustrated embodiment, the components of the SOC 10 include a central processing unit (CPU) complex 14, an "always-on" component 16, peripheral components 18A-18B (more briefly, "peripherals"), a memory controller 22, a power manager (PMGR) 32, an internal clock generator circuit 36, and a communication fabric 27. The components 14, 16, 18A-18B, 22, 32, and 36 may all be coupled to the communication fabric 27. The memory controller 22 may be coupled to the memory 12 during use. The always-on component 16 may be coupled to the external clock source 34. In the illustrated embodiment, the CPU complex 14 may include one or more processors (P 30 in FIG. 1). The processors 30 may form the CPU(s) of CPU complex 14 within the SOC 10. In some embodiments, a second internal clock generator circuit 37 may be included and may be coupled to one or more local timebases (e.g. the local timebase 26B in FIG. 1). In such an embodiment, the local timebase 26B may not be coupled to the clock generator circuit 36. Multiple additional clock generator circuits may be included in still other embodiments.

Various components in the SOC 10 may have access to a timebase to determine time. Timebases may be used to generate timestamps for events (so that the temporal order of events may be ascertained, for example, or so that a given event may be associated with a particular real time (wall clock time)). Timebases may be used to provide time to applications (e.g. to display for a user, for example, or to allow for time-based notifications such as alerts or alarms). Timebases may be used to measure elapsed time (e.g. to schedule execution of tasks in a multi-tasking operating system). In general, a timebase may be any measure of time. In an embodiment, a timebase may be a value that represents time at a certain granularity (e.g. the least significant digit may represent a specific amount of time). Some of the least significant digits may not actually be implemented (e.g. if the timebase value measures time at a higher granularity than clocks in the SOC 10 may permit). In other embodiments, the timebase value may measure ticks of a clock in the SOC 10. Based on the frequency of the clock, real time may be calculated.

The components that use the timebase may include local timebase circuits (e.g. the local timebase circuits 26A-26D in the CPU complex 14, the peripheral 18A, the memory controller 22, and the PMGR 32 in FIG. 1). In an embodiment, a component may have multiple local timebase circuits (e.g. there may be a local timebase circuit 26A-26D for each CPU 30 in the CPU complex 14) and/or multiple components may share a local timebase circuit 26A-26D. A global timebase circuit 20 in the always-on component 16 may be configured to synchronize the local timebases maintained by the local timebase circuits 26A-26D. In some embodiments, the global timebase circuit 20 may also maintain a global timebase.

The clock generator 36 may be configured to generate a relatively high frequency clock (Fr_clk) that may be used to update the local timebases (and optionally the global timebase, if included). Thus, the Fr_clk is coupled between the clock generator 36, the local timebase circuits 26A-26D, and optionally the global timebase circuit 20. The clock generator 36 may have any design and configuration, such as a phase-locked-loop (PLL), delay-locked-loop (DLL), etc. Generally, the clock generator 36 may be subject to various sources of inaccuracy that lead to variation in the clock frequency of the Fr_clk during use. For example, the circuitry in the clock generator 36 may be subject to variation due to temperature changes, supply voltage variation that changes delays in the circuitry, jitter, noise, etc. The supply voltage variation may include both transient variation due to noise, load, etc., and intentional variation such as dynamic voltage changes during use. The frequency of the Fr_clk may drift over time, running faster and/or slower than the desired frequency. Thus, there may be error in the local timebases.

Based on circuit analysis, empirical data, and/or simulations, the frequency variation may be determined to be within a range around the desired frequency. The desired frequency (i.e. the frequency expected from the clock generator 36) may be referred to as the nominal frequency. A clock may be referred to as nominally having a given frequency, where it is known that there may be some variation around the nominal frequency. Clocks may be referred to as nominally having higher or lower frequency by comparing their nominal frequencies, knowing that variations can cause the frequencies to vary.

A lower frequency clock (Rt_clk) may be received on an input to the SOC 10 (e.g. for the external clock source 34). The external clock source 34 may be a "high quality" clock source such as, e.g., a crystal oscillator. Clock quality may be measured in a variety of ways, but may generally refer to a clock that experiences low variation during use. Thus, the Rt_clk may have lower variation during use than the Fr_clk, for example. That is, the range of variation in the clock frequency around the nominal frequency of the Rt_clk may be smaller than the range of variation in the Fr_clk.

Accordingly, synchronization events may be triggered from the Rt_clk to synchronize the local timebases (both to each other and to the correct timebase value). A synchronization event may be any communication that causes a synchronization of the timebases is to occur. For example, the global timebase circuit 20 may be configured to assert a signal, triggered from the Rt_clk, to the local timebase circuits 26A-26C. The global timebase circuit 20 may also communicate the next timebase synchronization value based on the Rt_clk, so that the local timebases have the synchronization value for update. In an embodiment, the global timebase circuit 20 may trigger a synchronization event once each period of the Rt_clk signal. For example, the synchronization event may be triggered at an edge of the clock. The rising edge may be used as an example in this description, but the falling edge may also be used. The global timebase circuit 20 may also transmit the next timebase synchronization value responsive to an edge (e.g. the opposite edge to the synchronization event edge, or the falling edge for the rising edge example). Other embodiments may define the synchronization event as occurring once per multiple periods of the Rt_clk, or on each edge of the Rt_clk, as desired.

The next timebase synchronization value may be generated each synchronization period from the previous synchronization value and a value that depends on the ratio of the frequencies of the Fr_clk and the Rt_clk. The ratio may not be an integer value, and thus the timebase may have an integer part and a fractional part in terms of Rt_clk cycles. For example in one embodiment, the Fr_clk may be 24 megahertz (MHz) and the Rt_clk may be 32,768 Hz. In this example, the ratio is 24 MHz/32,768 Hz, or 46875/64 in simplest mathematical form. Accordingly, the difference between consecutive synchronization timebase values may be 46875, and each clock cycle of the Fr_clk may be an increment of 64 on the local time base. The fractional part may be 5 bits since each increment is 64, and the fractional part may be implemented or not implemented, as desired, in various embodiments. In some embodiments, the fractional part may be used to prevent the local timebase from drifting relative to a timebase derived from an external clock source. Thus, both the per-Fr_clk increment and the difference in consecutive synchronization values may be dependent on the ratio of the frequencies.

In an embodiment, at least one local timebase circuit 26A-26D is configured to capture the next timebase synchronization value transmitted by the global timebase circuit 20 and may compare the local timebase to the next timebase synchronization value as the local timebase is incremented within a given synchronization period. If the Fr_clk is operating at a higher frequency than expected, the local timebase may reach the next timebase synchronization value prior to the end of the synchronization period. The local timebase circuits 26A-26D may saturate the local timebase value at the next timebase synchronization value for the remainder of the synchronization period. Thus, the local timebase may not "get ahead" of the correct timebase value by more than the timebase will have at the end of the synchronization period. Additionally, in response to the synchronization event, the local timebase circuits 26A-26D may load the next timebase synchronization value into the local timebase (assuming that the local timebase hasn't reached the next synchronization value). The loading of the next timebase synchronization value may prevent the local timebase from getting "behind" the correct timebase by more than a synchronization period.

Any communication mechanism may be used to transmit the next timebase synchronization value from the global timebase circuit 20 to the local timebase circuits 26A-26D. In an embodiment, a serial interface at the rate of the Fr_clk may be used to transmit the value. Since the Fr_clk is significantly higher frequency that the Rt_clk in this example, the next timebase synchronization value may be received in the local timebase circuits 26A-26B long before the end of the synchronization period.

While the illustrated embodiment shows one Fr_clk provided from the clock generator circuit 36 to the local timebase circuits 26A-26D and the global timebase circuit 20, other embodiments may have multiple sources of Fr_clk, such as the clock generator circuit 37 providing the Fr_clk2 to the local timebase circuit 26B, shown in dot-dash form in FIG. 1. In such an embodiment, the local timebase circuit 26B may not receive the Fr_clk from the clock generator circuit 36. In still other embodiments, there may be more internal clock generator circuits providing other Fr_clks to various local timebase circuits 26A-26D. The sources may be independent of each other, so that a phase and frequency of the clocks may differ in use.

As mentioned previously, increments may saturate at the next timebase synchronization value for a given synchronization period. Generally, saturating a value may refer to incrementing up to the value, but then holding the incremented result steady at the value even in the face of additional increments. Incrementing may generally refer to increasing a value by a fixed amount during use. The fixed amount may be one, in some embodiments, or any other integer or other value. In the example mentioned above, the increment may be 64.

In an embodiment, the always-on component 16 may be configured to remain powered up when other components of the SOC 10 (e.g. the CPU complex 14, the peripherals 18A-18B, and the PMGR 32) are powered down. More particularly, the always-on component 16 may be on whenever the SOC 10 is receiving power from an external power management unit (PMU). Thus, the always-on component is "always-on" in the sense that it may be powered on if the SOC 10 is receiving any power (e.g. at times when the device including the SOC 10 is in standby mode or is operating actively), but may not be powered on when the SOC 10 is not receiving any power (e.g. at times when the device is completely turned off). The always-on component 16 may support certain functions while the remainder of the SOC 10 is off, allowing low power operation. Additionally, the global timebase circuit 20 may continue to maintain the global timebase for the system, so that the global timebase need not be reinitialized at the next power up of the SOC 10

In FIG. 1, a dotted line 24 separating the always-on component 16 from the other components may indicate an independent power domain for the always-on component 16. Other components, groups of components, and/or subcomponents may have independent power domains as well. Generally, a power domain may be configured to receive supply voltage (i.e. be powered on) or not receive supply voltage (i.e. be powered off) independent of other power domains. In some embodiments, power domains may be supplied with different supply voltage magnitudes concurrently. The independence may be provided in a variety of fashions. For example, the independence may be provided by providing separate supply voltage inputs from the external PMU, by providing power switches between the supply voltage inputs and components and controlling the power switches for a given domain as a unit, and/or a combination of the above. There may be more power domains than those illustrated in FIG. 1 as well. For example, the CPU complex 14 may have an independent power domain (and each CPU processor 30 may have an independent power domain as well) in an embodiment. One or more peripheral components 18A-18B may be in one or more independent power domains in an embodiment.

Generally, a component may be referred to as powered on or powered off. The component may be powered on if it is receiving supply voltage so that it may operate as designed. If the component is powered off, then it is not receiving the supply voltage and is not in operation. The component may also be referred to as powered up if it is powered on, and powered down if it is powered off. Powering up a component may refer to supplying the supply voltage to a component that is powered off, and powering down the component may refer to terminating the supply of the supply voltage to the component. Similarly, any subcomponent and/or the SOC 10 as a whole may be referred to as powered up/down, etc. A component may be a predefined block of circuitry which provides a specified function within the SOC 10 and which has a specific interface to the rest of the SOC 10. Thus, the always-on component 16, the peripherals 18A-18B, and the CPU complex 14, the memory controller 22, and the PMGR 32 may each be examples of a component.

A component may be active if it is powered up and not clock gated. Thus, for example, a processor in the CPU complex 14 may be available for instruction execution if it is active. A component may be inactive if it is powered off or in another low power state in which a significant delay may be experienced before instructions may be executed. For example, if the component requires a reset or a relock of a phase lock loop (PLL), it may be inactive even if it remains powered. A component may also be inactive if it is clock gated. Clock gating may refer to techniques in which the clock to the digital circuitry in the component is temporarily "turned off," preventing state from being captured from the digital circuitry in clocked storage devices such as flops, registers, etc.

As mentioned above, the CPU complex 14 may include one or more processors 30 that may serve as the CPU(s) of the CPU complex 14 in the SOC 10. The CPU of the system includes the processor(s) that execute the main control software of the system, such as an operating system. Generally, software executed by the CPU during use may control the other components of the system to realize the desired functionality of the system. The processors may also execute other software, such as application programs. The application programs may provide user functionality, and may rely on the operating system for lower-level device control, scheduling, memory management, etc. Accordingly, the processors may also be referred to as application processors. The CPU complex 14 may further include other hardware such as an L2 cache and/or an interface to the other components of the system (e.g. an interface to the communication fabric 27).

An operating point may refer to a combination of power supply voltage magnitude and operating frequency for the CPU complex 14, the always-on component 16, other components of the SOC 10, etc. The operating frequency may be the frequency of the clock that clocks the component. The operating frequency may also be referred to as the clock frequency or simply the frequency. The operating point may also be referred to as an operating state or power state. The operating point may be part of the programmable configuration data that may be stored in the always-on component 16 and reprogrammed into the components when reconfiguration occurs.

Generally, a processor may include any circuitry and/or microcode configured to execute instructions defined in an instruction set architecture implemented by the processor. Processors may encompass processor cores implemented on an integrated circuit with other components as a system on a chip (SOC 10) or other levels of integration. Processors may further encompass discrete microprocessors, processor cores and/or microprocessors integrated into multichip module implementations, processors implemented as multiple integrated circuits, etc.

The memory controller 22 may generally include the circuitry for receiving memory operations from the other components of the SOC 10 and for accessing the memory 12 to complete the memory operations. The memory controller 22 may be configured to access any type of memory 12. For example, the memory 12 may be static random access memory (SRAM), dynamic RAM (DRAM) such as synchronous DRAM (SDRAM) including double data rate (DDR, DDR2, DDR3, DDR4, etc.) DRAM. Low power/mobile versions of the DDR DRAM may be supported (e.g. LPDDR, mDDR, etc.). The memory controller 22 may include queues for memory operations, for ordering (and potentially reordering) the operations and presenting the operations to the memory 12. The memory controller 22 may further include data buffers to store write data awaiting write to memory and read data awaiting return to the source of the memory operation. In some embodiments, the memory controller 22 may include a memory cache to store recently accessed memory data. In SOC implementations, for example, the memory cache may reduce power consumption in the SOC by avoiding reaccess of data from the memory 12 if it is expected to be accessed again soon. In some cases, the memory cache may also be referred to as a system cache, as opposed to private caches such as the L2 cache or caches in the processors, which serve only certain components. Additionally, in some embodiments, a system cache need not be located within the memory controller 22.

The peripherals 18A-18B may be any set of additional hardware functionality included in the SOC 10. For example, the peripherals 18A-18B may include video peripherals such as an image signal processor configured to process image capture data from a camera or other image sensor, display controllers configured to display video data on one or more display devices, graphics processing units (GPUs), video encoder/decoders, scalers, rotators, blenders, etc. The peripherals may include audio peripherals such as microphones, speakers, interfaces to microphones and speakers, audio processors, digital signal processors, mixers, etc. The peripherals may include interface controllers for various interfaces external to the SOC 10 (e.g. the peripheral 18B) including interfaces such as Universal Serial Bus (USB), peripheral component interconnect (PCI) including PCI Express (PCIe), serial and parallel ports, etc. The peripherals may include networking peripherals such as media access controllers (MACs). Any set of hardware may be included.

The communication fabric 27 may be any communication interconnect and protocol for communicating among the components of the SOC 10. The communication fabric 27 may be bus-based, including shared bus configurations, cross bar configurations, and hierarchical buses with bridges. The communication fabric 27 may also be packet-based, and may be hierarchical with bridges, cross bar, point-to-point, or other interconnects.

The PMGR 32 may be configured to control the supply voltage magnitudes requested from the external PMU. There may be multiple supply voltages generated by the external PMU for the SOC 10. For example, there may be a supply voltage for the CPU complex 14, a supply voltage for the rest of the SOC, a supply voltage for the memory 12, etc. The PMGR 32 may be under direct software control (e.g. software may directly request the power up and/or power down of components) and/or may be configured to monitor the SOC 10 and determine when various components are to be powered up or powered down.

It is noted that the number of components of the SOC 10 (and the number of subcomponents for those shown in FIG. 1, such as within the CPU complex 14) may vary from embodiment to embodiment. There may be more or fewer of each component/subcomponent than the number shown in FIG. 1.

Figure 2:
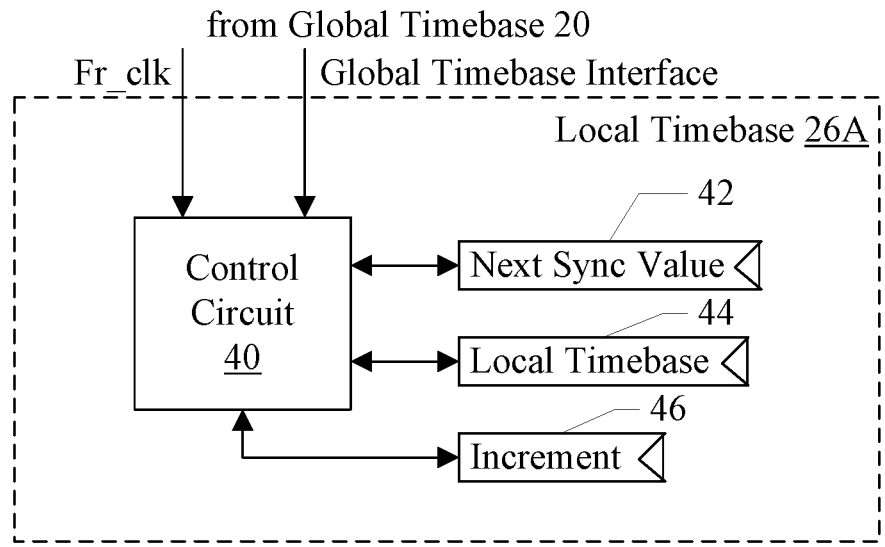
FIG. 2 is a block diagram of one embodiment of a local timebase circuit.

FIG. 2 is a block diagram of one embodiment of the local timebase circuit 26A. Other local timebase circuits 26B-26D may be similar. In the embodiment of FIG. 2, the local timebase circuit 26A includes a control circuit 40, a next sync value register 42, a local timebase register 44, and an increment register 46. The control circuit 40 is coupled to the Fr_clk input and the global timebase interface from the global timebase circuit 20, and is further coupled to the next sync value register 42, the local timebase register 44, and the increment register 46.

In response to the Fr_clk, the control circuit 40 may be configured to increment the local timebase register 44, subject to saturation at the next timebase sync value ("next sync value") in the register 42. For example, the increment may be applied responsive to each rising edge of the Fr_clk. As mentioned previously, the size of the increment may be dependent on the ratio of the Fr_clk frequency to the Rt_clk frequency, in an example embodiment. The size of the increment may be programmed into the increment register 46, for example. The control circuit 40 may add the increment to the current local timebase and write the result (saturated at the next sync value) to the local timebase register 44.

In an embodiment, the next sync value may be transmitted to the local timebase circuit 26A over the global timebase interface during the period between synchronization events. In the example above, synchronization events occur at the rising edge of the Rt_clk and the next sync value is transmitted at the falling edge of the Rt_clk. More particularly, the global timebase interface may be a serial interface operating at the Fr_clk frequency, and may transmit the next sync value over multiple clock cycles of the Fr_clk beginning at the falling edge of the Rt_clk, in an embodiment. The control circuit 40 may be configured to operate the next sync value register 42 as a shift register when the next sync value is being provided, and may be configured to indicate that the next sync value is valid once it has been shifted into the next sync value register 42. The control circuit 40 may be configured to treat the next sync value as invalid in response to a synchronization event, until an updated value is transmitted. Other embodiments may transmit the value as a parallel bus, or using other mechanisms.

In other embodiments, the local timebase circuit 26A may receive the difference between sync values from the global timebase circuit 20, and may be configured to generate the next sync value locally, by adding the difference to the previous value.

Figure 3:
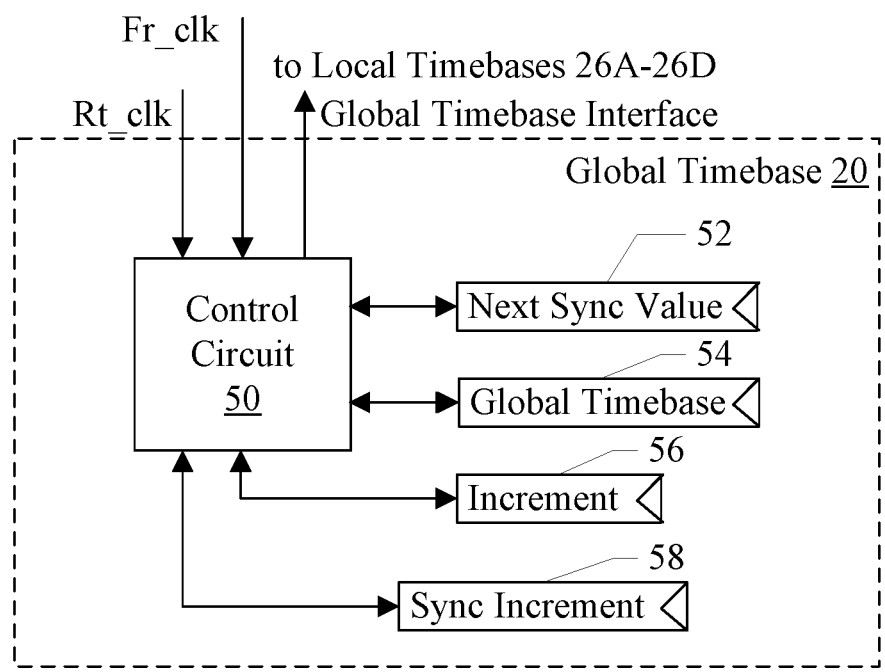
FIG. 3 is a block diagram of one embodiment of a global timebase circuit.

Turning next to FIG. 3, a block diagram of one embodiment of the global timebase circuit 20 is shown. In the embodiment of FIG. 3, the global timebase circuit 20 includes a control circuit 50, a next sync value register 52, a global timebase register 54, an increment register 56, and a synchronization increment register 58. The control circuit 50 is coupled to the Rt_clk input, the Fr_clk input, and the global timebase interface to the local timebase circuits 26A-26D. The control circuit 50 is further coupled to the next sync value register 52, the global timebase register 54, the increment register 56, and the synchronization increment register 58.

Similar to the discussion above for the local timebase circuit 26A, the control circuit 50 may be configured to increment the global timebase register 54 subject to saturation at the next timebase sync value ("next sync value") in the register 52. The size of the increment may be programmed into the increment register 56, for example. The control circuit 50 may add the increment to the current global timebase and write the result (saturated at the next sync value) to the global timebase register 54. In other embodiments, the global timebase register 54 may not be provided. For example, if all components that access the timebase have access to a local timebase circuit 26A-26D, the global timebase register 54 may not be needed. Instead, the global timebase circuit 20 may be responsible for synchronization of the local timebases responsive to the Rt_clk.

In an embodiment, the control circuit 50 may generate the next sync value in response to a synchronization event, by adding the synchronization increment from the register 58 to the current contents of the next sync value register 52 and writing the result to the next sync value register 52. The synchronization increment may be programmed into the synchronization increment register 58, and may depend on the ratio of the frequencies of the Fr_clk and Rt_clk. The control circuit 50 may be configured to transmit the next synchronization value to the local timebase circuits 26A-26D over the global timebase interface during the period between synchronization events, as described above with respect to the local timebase circuit 26A.

Figure 4:
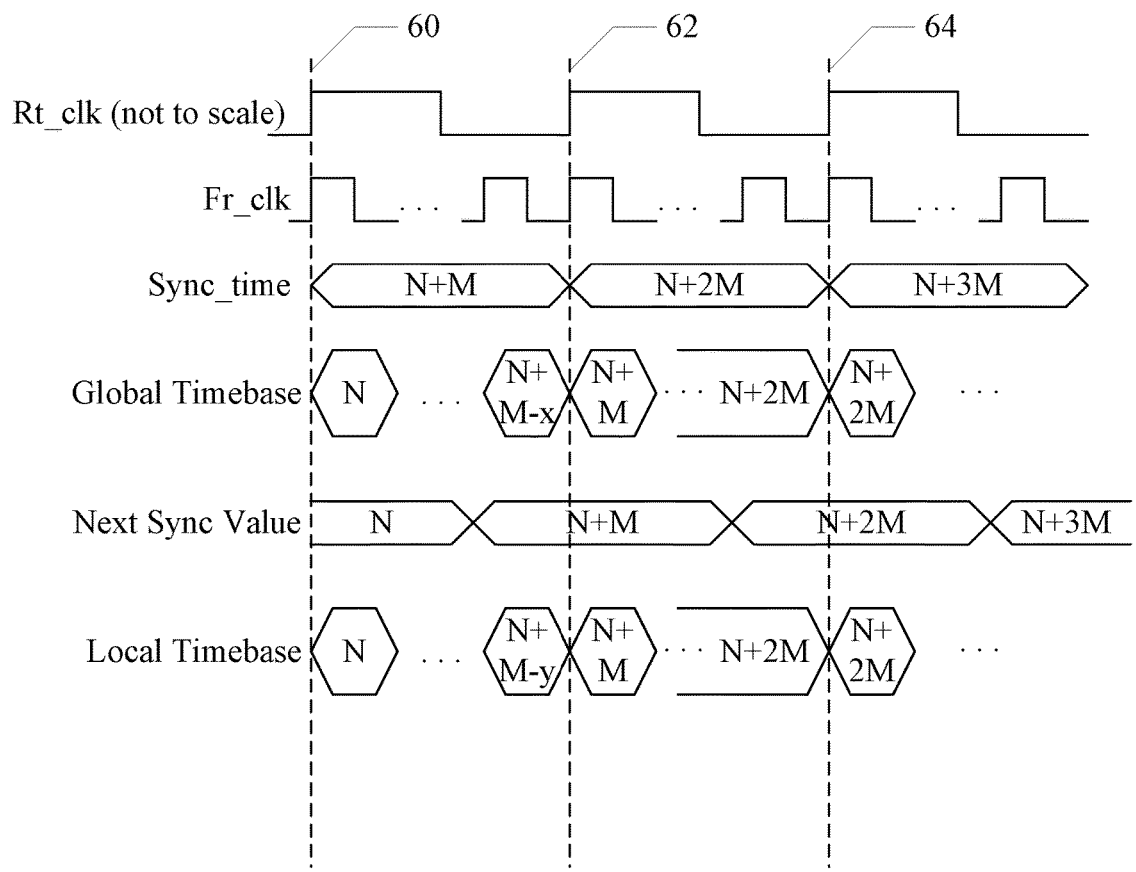
FIG. 4 is a timing diagram illustrating one embodiment of timebase synchronization.

FIG. 4 is a timing diagram illustrating operation of one embodiment of the local timebase circuits 26A-26D and the global timebase circuit 20. In FIG. 4, the Rt_clk is shown (but not to scale with respect to the Fr_clk, for large ratios of frequency) as well as the Fr_clk. The sync_time may be the next sync value in the next sync value register 56 in the global timebase circuit 50. Thus, the sync_time may change to the next sync value (valid for the subsequent rising Rt_clk edge) at the current rising Rt_clk edge. Thus, the sync_time changes from N to N+M (where M is the synchronization increment in the synchronization increment register 58) in the first period of the Rt_clk in FIG. 4, then N+2M in the second period and N+3M in the third period. Responsive to the falling edges of the Rt_clk, the global timebase circuit 20 may transmit the sync_time to the local timebase circuits 26A-26D, and thus they next sync value as shown in FIG. 4 (the next sync value in the register 42 in the local timebase circuits 26A-26D) may update approximately midway through the Rt_clk period.

The global timebase and local timebase values are shown in each period as well. At the beginning of the first period shown (dotted line 60), both timebases are synchronized to N. In the first clock period, the Fr_clk may be running behind and thus, at the end of the period (dotted line 62) the timebases are below the next synchronization value (e.g. N+M−x for the global timebase and N+M−y for the local timebase). The global and local timebases may be different due to different clock sources for the Fr_clk, or other variations in the Fr_clk (e.g. due to an unbalanced clock tree for the Fr_clk or other local variations). In other cases, x and y may be equal.

The global timebase circuit 20 and the local timebase circuits 26A-26D may load the next synchronization value responsive to the synchronization event (prior to updating the next synchronization value for the following period) and thus both the global timebase and the local timebase move to N+M at the start of the second period. In the second period, the Fr_clk may be operating faster than expected and thus the global timebase and the local timebase may be saturated at N+2M by the end of the second period (e.g. dotted line 64).

It is noted that the timing diagram of FIG. 4 is merely exemplary to illustrate both saturation and loading of the synchronization value. In actual operation, adjacent periods may often have the same behavior (e.g. saturation or loading), switching to the opposite synchronization less frequently.

Figure 5:
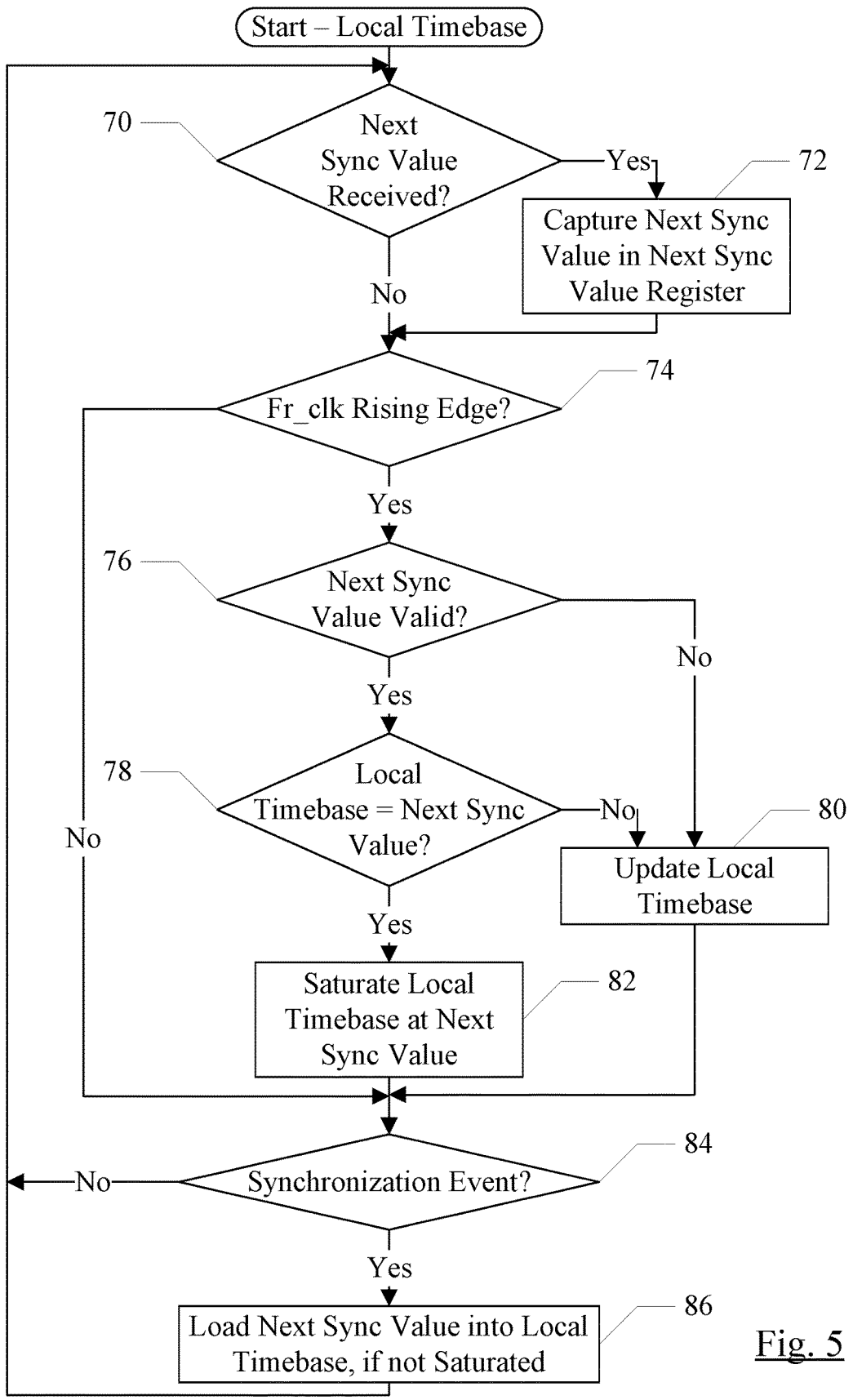
FIG. 5 is a flowchart illustrating operation of one embodiment of the local timebase circuit to synchronize timebases.

FIG. 5 is a flowchart illustrating operation of one embodiment of the local timebase circuits 26A-26D (and more particularly the control circuit 40, in the embodiment of FIG. 2). While the blocks are shown in a particular order for ease of understanding, other orders may be used. Blocks may be performed in parallel in combinatorial logic circuitry in the control circuit 40. Blocks, combinations of blocks, and/or the flowchart as a whole may be pipelined over multiple clock cycles. The control circuit 40 may be configured to implement the operation shown in FIG. 5.

If the next sync value is being received from the global timebase circuit 20 (decision block 70, "yes" leg), the control circuit 40 may be configured to capture the next sync value in the next sync value register 42 (block 72). For example, as mentioned above, the global timebase circuit 20 may transmit the next sync value as a serial bit stream at the Fr_clk clock rate. In such an embodiment, capturing the next sync value may include shifting in the serial data into the next sync value register 42. The next sync value may be invalid from the beginning of the sync period until the data has been captured in the register 42.

If the Fr_clk clock rising edge is detected (decision block 74, "yes" leg), and either the next sync value is not valid (decision block 76, "no" leg) or the next sync value is valid (decision block 76, "yes" leg) and the local timebase value has not reached the next sync value (decision block 78, "no" leg), the control circuit 40 may be configured to update the local timebase in the register 44 (block 80). More particularly, in an embodiment, the update may be an increment of the value in the register 44 by the increment value in the register 46. On the other hand, if the Fr_clk clock rising edge is detected (decision block 74, "yes" leg), the next sync value is valid (decision block 76, "yes" leg) and the local timebase value has reached the next sync value (decision block 78, "yes" leg), the control circuit 40 may be configured to saturate the local timebase in the register 44 at the next sync value (block 82).

If a synchronization event is being signaled by the global timebase circuit 20 (decision block 84, "yes" leg), the control circuit 40 may be configured to load the next synchronization value into the local timebase, if the local timebase is not already saturated (block 86). Since the saturation is at the next synchronization value, the load may be performed independent of the contents of the local timebase at the time of the synchronization event. If the local timebase is saturated, it is already at the next synchronization value and thus no load is required, although the load may be performed anyway.

Figure 6:
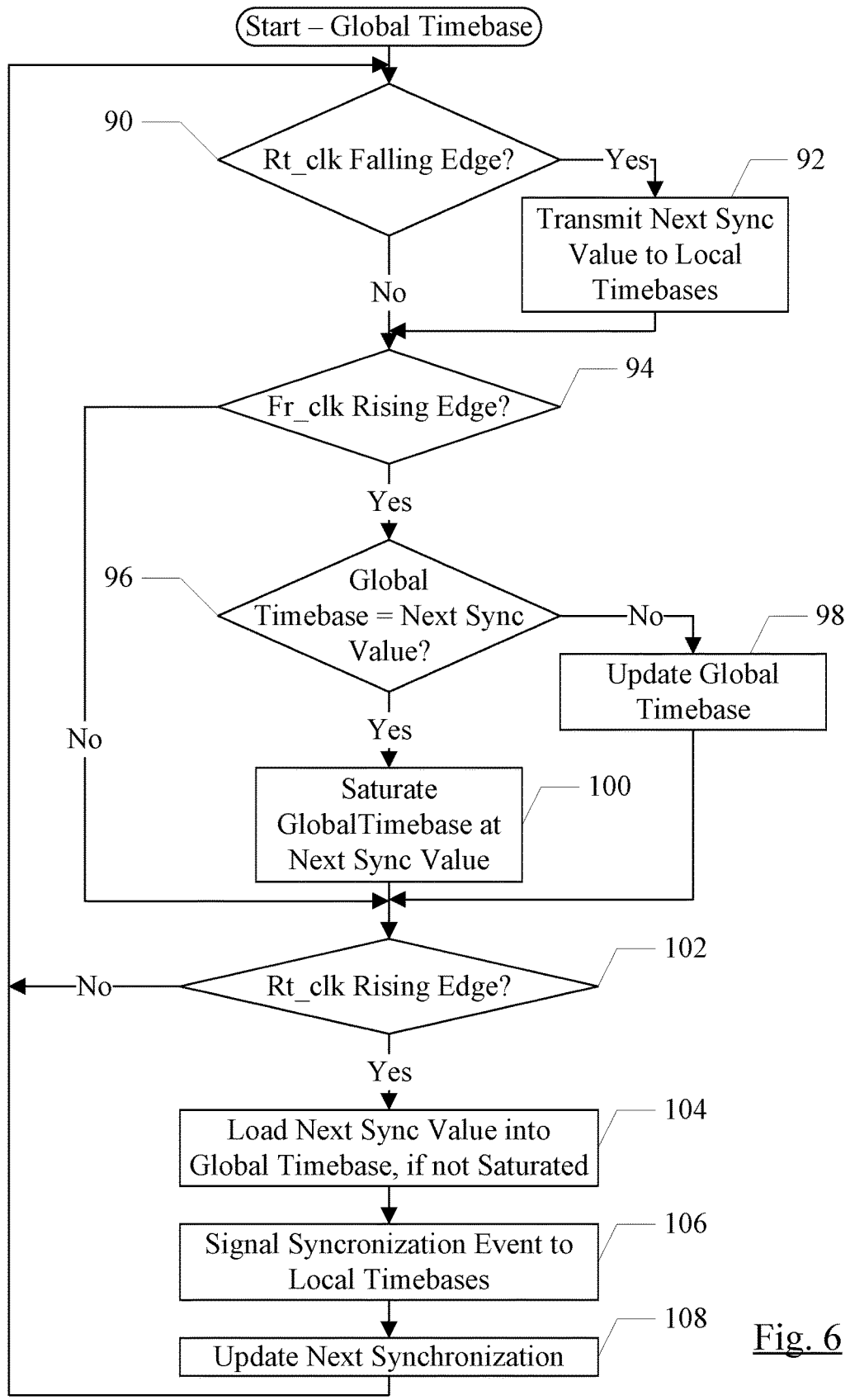
FIG. 6 is a flowchart illustrating operation of one embodiment of the global timebase circuit to synchronize timebases.

FIG. 6 is a flowchart illustrating operation of one embodiment of the global timebase circuit 20 (and more particularly the control circuit 50, in the embodiment of FIG. 3). While the blocks are shown in a particular order for ease of understanding, other orders may be used. Blocks may be performed in parallel in combinatorial logic circuitry in the control circuit 50. Blocks, combinations of blocks, and/or the flowchart as a whole may be pipelined over multiple clock cycles. The control circuit 50 may be configured to implement the operation shown in FIG. 6.

If the Rt_clk falling edge is detected, (decision block 90, "yes" leg), the control circuit 50 may be configured to transmit the next sync value in the next sync value register 52 to the local timebase circuits 26A-26D (block 92). For example, as mentioned above, the global timebase circuit 20 may transmit the next sync value as a serial bit stream at the Fr_clk clock rate.

If the Fr_clk clock rising edge is detected (decision block 94, "yes" leg) and the global timebase value has not reached the next sync value (decision block 96, "no" leg), the control circuit 50 may be configured to update the global timebase in the register 54 (block 98). More particularly, in an embodiment, the update may be an increment of the value in the register 54 by the increment value in the register 56. On the other hand, if the Fr_clk clock rising edge is detected (decision block 94, "yes" leg) and the global timebase value has reached the next sync value (decision block 96, "yes" leg), the control circuit 50 may be configured to saturate the global timebase in the register 54 at the next sync value (block 100).

If the Rt_clk rising edge is detected (decision block 102, "yes" leg), a synchronization event occurs. The control circuit 50 may be configured to load the next synchronization value into the global timebase, if the global timebase is not already saturated (block 104). Since the saturation is at the next synchronization value, the load may be performed independent of the contents of the global timebase at the time of the synchronization event. The control circuit 50 may also be configured to signal the synchronization event to the local timebase circuits 26A-26D (block 106). Additionally, the control circuit 50 may be configured to update the next synchronization value in the register 52 by adding the current value to the synchronization increment from the register 58 (block 108).

Figure 7:
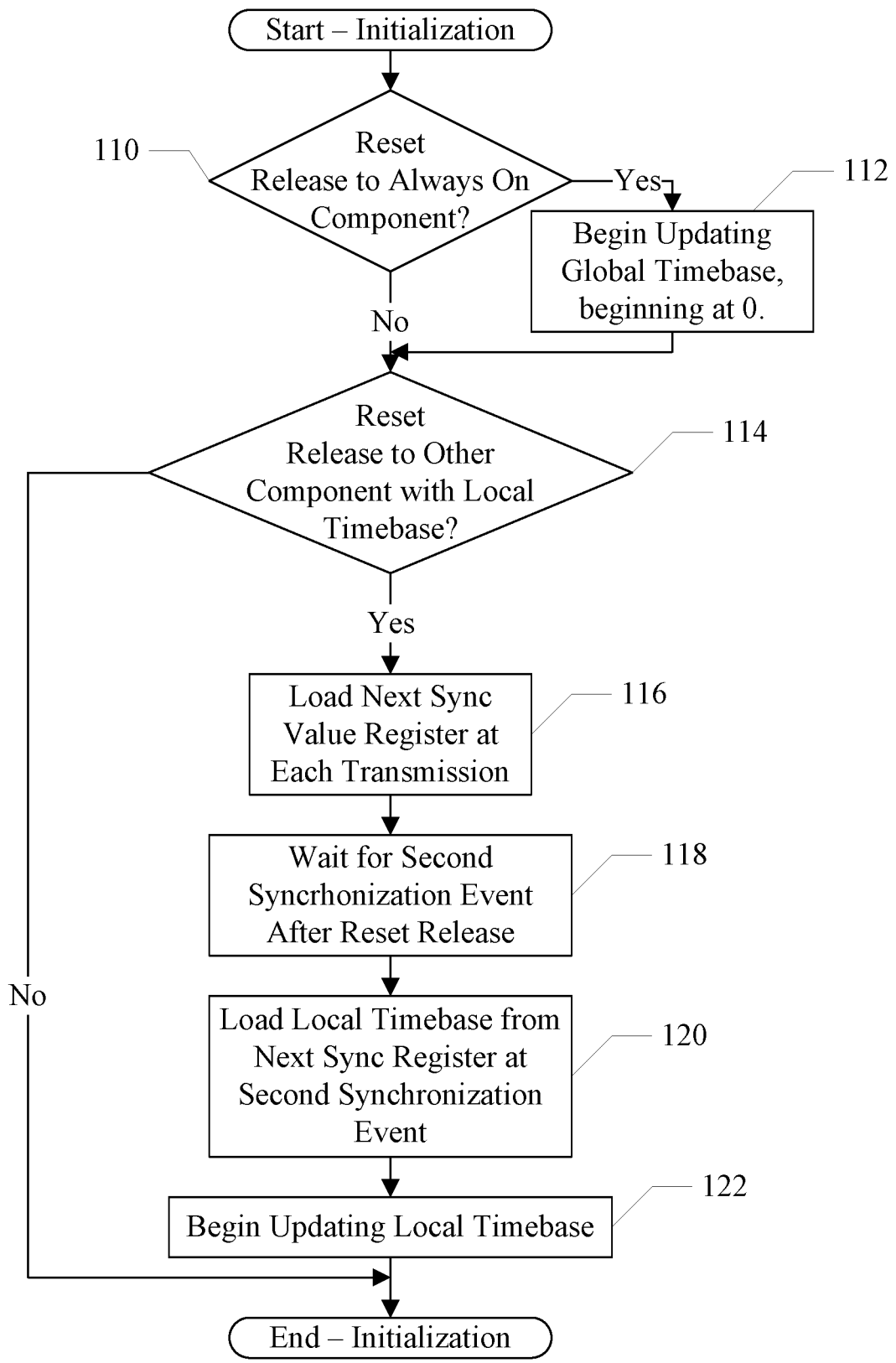
FIG. 7 is a flowchart illustrating operation of one embodiment of the global timebase circuit and the local timebase circuit to initialize timebases.

FIG. 7 is a flowchart illustrating initialization of the global and local timebases, for one embodiment (and more particularly for the control circuits 40 and 50, for the embodiments of FIGS. 2 and 3, respectively). While the blocks are shown in a particular order for ease of understanding, other orders may be used. Blocks may be performed in parallel in combinatorial logic circuitry in the control circuits 40 and 50. Blocks, combinations of blocks, and/or the flowchart as a whole may be pipelined over multiple clock cycles. The control circuits 40 and 50 may be configured to implement the operation shown in FIG. 7.

The global timebase circuit 20 may be part of the always-on component 16 and thus may be reset based on the release of reset to the always-on component 16. Particularly, when power is first supplied to the SOC 10 after a period of no power, the always-on component 16 may be reset. Generally, as long as the SOC 10 has power supplied, the always-on component 16 may be on and need not be reset, even if other portions of the SOC 10 have been powered off. If the always-on component 16 is reset and the reset is released (decision block 110, "yes" leg), the control circuit 50 may update the global timebase register 54, beginning at 0, based on the Fr_clk (block 112). The updates may be performed as described above with regard to FIG. 6.

If another component in the SOC 10 (besides the always-on component 16) has been reset and the reset is released (decision block 114, "yes" leg), the control circuit 40 in the corresponding local timebase circuit 26A-26D may begin capturing the next sync value in the next sync value register 42 at each transmission from the global timebase circuit 20 (block 116). However, in embodiments in which the next sync value is serially transmitted, it is possible that the reset is released during the transmission and thus the next sync value is not correctly captured. Accordingly, the control circuit 40 may wait to detect the second synchronization event after the reset release (block 118), and then may load the next synchronization value from the next synchronization register 42 into the local timebase register 44 (block 120). The control circuit 40 may then begin updating the register at the Fr_clk value as described with regard to FIG. 5 (block 122).

Figure 8:
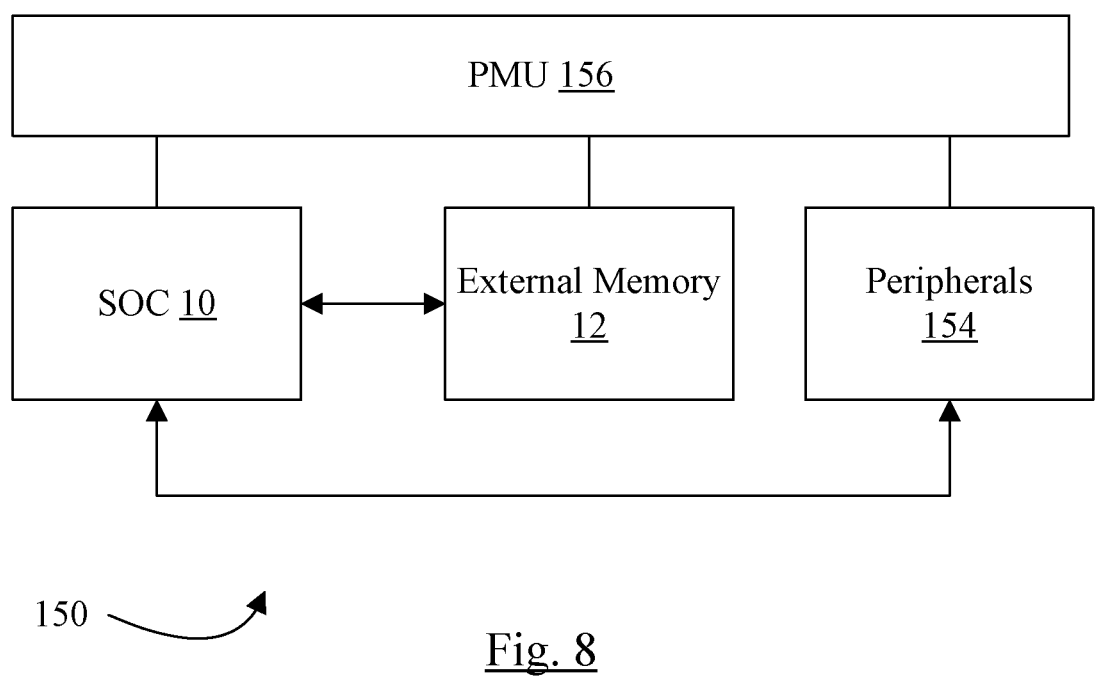
FIG. 8 is a block diagram of one embodiment of a system.

Turning next to FIG. 8, a block diagram of one embodiment of a system 150 is shown. In the illustrated embodiment, the system 150 includes at least one instance of the SOC 10 coupled to one or more peripherals 154 and an external memory 12. A power management unit (PMU) 156 is provided which supplies the supply voltages to the SOC 10 as well as one or more supply voltages to the memory 12 and/or the peripherals 154. In some embodiments, more than one instance of the SOC 10 may be included (and more than one memory 12 may be included as well).

The PMU 156 may generally include the circuitry to generate supply voltages and to provide those supply voltages to other components of the system such as the SOC 10, the memory 12, various off-chip peripheral components 154 such as display devices, image sensors, user interface devices, etc. The PMU 156 may thus include programmable voltage regulators, logic to interface to the SOC 10 and more particularly the SOC PMGR 16 to receive voltage requests, etc.

The peripherals 154 may include any desired circuitry, depending on the type of system 150. For example, in one embodiment, the system 150 may be a mobile device (e.g. personal digital assistant (PDA), smart phone, etc.) and the peripherals 154 may include devices for various types of wireless communication, such as wifi, Bluetooth, cellular, global positioning system, etc. The peripherals 154 may also include additional storage, including RAM storage, solid state storage, or disk storage. The peripherals 154 may include user interface devices such as a display screen, including touch display screens or multitouch display screens, keyboard or other input devices, microphones, speakers, etc. In other embodiments, the system 150 may be any type of computing system (e.g. desktop personal computer, laptop, workstation, net top etc.).

The external memory 12 may include any type of memory. For example, the external memory 12 may be SRAM, dynamic RAM (DRAM) such as synchronous DRAM (SDRAM), double data rate (DDR, DDR2, DDR3, etc.) SDRAM, RAMBUS DRAM, low power versions of the DDR DRAM (e.g. LPDDR, mDDR, etc.), etc. The external memory 12 may include one or more memory modules to which the memory devices are mounted, such as single inline memory modules (SIMMs), dual inline memory modules (DIMMs), etc. Alternatively, the external memory 12 may include one or more memory devices that are mounted on the SOC 10 in a chip-on-chip or package-on-package implementation.

Numerous variations and modifications will become apparent to those skilled in the art once the above disclosure is fully appreciated. It is intended that the following claims be interpreted to embrace all such variations and modifications.

What is claimed is:

1. An apparatus comprising:
   a first timebase register;
   a first control circuit coupled to the first timebase register, wherein the first control circuit is configured to:
      increment a first timebase value in the first timebase register responsive to a first clock;
      saturate the first timebase value at a first value responsive to the first timebase value reaching the first value prior to a synchronization event; and
      load the first value into the first timebase register responsive to the synchronization event and to the first timebase value not reaching the first value prior to the synchronization event;
      wherein the first value is a value previously received for the synchronization event; and
   a second control circuit coupled to the first control circuit, wherein the second control circuit is configured to:
      generate the first value;
      generate the synchronization event responsive to a first edge of a second clock;
      signal the synchronization event to the first clock control circuit; and
      transmit the first value to the first control circuit responsive to a second edge of the second clock, wherein the second edge is an opposite edge from the first edge.

2. The apparatus as recited in claim 1 further comprising:
   a second timebase register;
   a third control circuit coupled to the second timebase register and the second control circuit, wherein the third control circuit is configured to:
      increment a second timebase value in the second timebase register responsive to a third clock;
      saturate the second timebase value at the first value responsive to the second timebase value reaching the first value prior to the synchronization event; and
      load the first value into the second timebase register responsive to the synchronization event and to the second timebase value not reaching the first value prior to the synchronization event.

3. The apparatus as recited in claim 2 wherein the first clock and the third clock have a same frequency, and wherein the second clock has a second frequency that is less than the same frequency.

4. The apparatus as recited in claim 1 wherein the first clock has a first frequency, and wherein the second clock has a second frequency that is less than the first frequency, and wherein a difference between the first values in consecutive synchronization events is dependent on a ratio of the first frequency to the second frequency.

5. The apparatus as recited in claim 4 wherein the first edge is a rising edge of the second clock.

6. The apparatus as recited in claim 5 wherein second edge is a falling edge of the second clock.

7. The apparatus as recited in claim 1 wherein the first clock is generated by a first clock source and the second clock is generated by a second clock source, wherein the first clock source is subject to a first variation during use and the second clock source is subject to a second variation during use, wherein a first range of the first variation is greater than a second range of the second variation.

8. The apparatus as recited in claim 1 further comprising a third timebase register coupled to the second control circuit, wherein the second control circuit is configured to:
increment a third timebase value in the third timebase register responsive to the first clock;
saturate the third timebase value at the first value responsive to the third timebase value reaching the first value prior to the synchronization event; and
load the first value into the third timebase register responsive to the synchronization event and to the third timebase value not reaching the first value prior to the synchronization event.

9. A method comprising:
incrementing a first timebase value in a first timebase register in a first timebase circuit responsive to a first clock;
generating a first value by a second timebase circuit, wherein the first value is a value for the next synchronization event;
generating a synchronization event by the second timebase circuit responsive to a first edge of the second clock;
signal the synchronization event to the first timebase register;
saturating the first timebase value at the first value responsive to the first timebase value reaching the first value prior to the synchronization event; and
loading the first value into the first timebase register responsive to the synchronization event and to the first timebase value not reaching the first value prior to the synchronization event;
transmitting from the second timebase circuit to the first timebase circuit, the first value responsive to a second edge of the second clock, wherein the first edge is opposite the second edge.

10. The method as recited in claim 9 further comprising:
incrementing a second timebase value in a second timebase register responsive to a third clock;
saturating the second timebase value at the first value responsive to the second timebase value reaching the first value prior to the synchronization event; and
loading the first value into the second timebase register responsive to the synchronization event and to the second timebase value not reaching the first value prior to the synchronization event.

11. The method as recited in claim 10 wherein the first clock and the third clock have a same frequency, and wherein the second clock has a second frequency that is less than the same frequency.

12. The method as recited in claim 9 wherein the first clock has a first frequency, and wherein the second clock has a second frequency that is less than the first frequency, and wherein a difference between the first values in consecutive synchronization events is dependent on a ratio of the first frequency to the second frequency.

13. The method as recited in claim 12 wherein the first edge is a rising edge of the second clock.

14. The method as recited in claim 13 wherein the second edge is a falling edge of the second clock.

15. The method as recited in claim 9 further comprising:
generating the first clock by a first clock source; and
generating the second clock by a second clock source, wherein the first clock source is subject to a first variation and the second clock source is subject to a second variation, wherein a first range of the first variation is greater than a second range of the second variation.

16. The method as recited in claim 9 further comprising:
incrementing a third timebase value in a third timebase register responsive to the first clock;
saturating the third timebase value at the first value responsive to the third timebase value reaching the first value prior to the synchronization event; and
loading the first value into the third timebase register responsive to the synchronization event and to the third timebase value not reaching the first value prior to the synchronization event.

17. An integrated circuit comprising:
a plurality of components, each including a local timebase circuit from which the component is configured to measure time, wherein the local timebase circuit is configured to update a local timebase responsive to a first clock operating at a first clock frequency; and
a global timebase circuit configured to synchronize the local timebases in each local time base circuit responsive to a second clock operating at a second clock frequency, wherein:
the global timebase circuit is configured to transmit, during a clock period of the second clock on a clock edge, a next timebase value that will be a correct timebase at an end of the clock period of the second clock having a different clock edge;
each local timebase circuit is configured to saturate the local timebase at the next timebase value responsive to the local timebase value reaching the next timebase value during the clock period; and
each local timebase circuit is configured to load the next timebase value into the local timebase responsive to not reaching the local timebase value prior to the end of the clock period.

18. The integrated circuit as recited in claim 17 further comprising a clock generation circuit configured to generate the first clock, and wherein the second clock is received from an input to the integrated circuit.

19. The integrated circuit as recited in claim 17 wherein the first clock has a first clock frequency and the second clock has a second clock frequency that is less than the first clock frequency, and wherein the ratio of the second clock frequency to the first clock frequency indicates a difference in consecutive next timebase values.

* * * * *